(12) United States Patent
Reed et al.

(10) Patent No.: US 7,221,825 B2
(45) Date of Patent: May 22, 2007

(54) OPTICAL COUPLER

(75) Inventors: Graham Reed, Guildford (GB); Goran Masanovic, Guildford (GB); Vittorio Passaro, Guildford (GB)

(73) Assignee: The University of Surrey, Guildford, Surrey (GB)

( * ) Notice: Subject to any disclaimer, the term of this patent is extended or adjusted under 35 U.S.C. 154(b) by 0 days.

(21) Appl. No.: 10/540,618

(22) PCT Filed: Dec. 23, 2003

(86) PCT No.: PCT/GB03/05634

§ 371 (c)(1),
(2), (4) Date: Jun. 23, 2005

(87) PCT Pub. No.: WO2004/057395

PCT Pub. Date: Jul. 8, 2004

(65) Prior Publication Data

US 2006/0120667 A1 Jun. 8, 2006

(30) Foreign Application Priority Data

Dec. 23, 2002 (GB) ................ 0229732.3

(51) Int. Cl.
*G02B 6/34* (2006.01)
*G02B 6/10* (2006.01)
(52) U.S. Cl. ............ 385/37; 385/31; 385/39; 385/50; 385/129; 385/130; 385/131; 385/132
(58) Field of Classification Search ............ 385/37
See application file for complete search history.

(56) References Cited

U.S. PATENT DOCUMENTS

| | | | |
|---|---|---|---|
| 4,776,661 A * | 10/1988 | Handa ............ | 385/37 |
| 5,140,149 A * | 8/1992 | Sakata et al. ............ | 257/436 |
| 5,412,743 A | 5/1995 | Brazas, Jr. | |
| 5,420,947 A | 5/1995 | Li et al. | |
| 5,444,802 A * | 8/1995 | Shibata et al. ............ | 385/16 |
| 6,404,958 B1 | 6/2002 | Feldman et al. | |
| 6,771,857 B1 * | 8/2004 | Domash et al. ............ | 385/37 |
| 2002/0122629 A1 | 9/2002 | Starodubov et al. | |

FOREIGN PATENT DOCUMENTS

WO   WO-2002/044780   6/2002

OTHER PUBLICATIONS

Kashyap, R.: "Fiber Bragg Gratings" 1999, Academic Press, USA XP002277349, p. 276-278.

* cited by examiner

*Primary Examiner*—Frank G. Font
*Assistant Examiner*—Ryan Lepisto
(74) *Attorney, Agent, or Firm*—Lahive & Cockfield, LLP

(57) ABSTRACT

An optical coupler comprises an input waveguide, an intermediate waveguide, an output waveguide, a first grating situated between the input and intermediate waveguides, and a second grating situated between the intermediate and output waveguides such that, in use, light propagating in the input waveguide is coupled into the intermediate waveguide with the assistance of the first grating, and thence is coupled into the output waveguide with the assistance of the second grating. The coupler is a directional coupler, in particular a dual grating-assisted directional coupler, and may be used to couple light between an optical fibre and an integrated semiconductor device, or between dissimilar waveguides.

20 Claims, 7 Drawing Sheets

OPTICAL COUPLER

RELATED APPLICATIONS

This application is a 35 U.S.C. 371 national stage filing of International Application No. PCT/GB2003/005634, filed 23 Dec. 2003, which claims priority to Great Britain Patent Application No. 0229732.3 filed on 23 Dec. 2002 in Great Britain. The contents of the aforementioned applications are hereby incorporated by reference.

FIELD OF THE INVENTION

The present invention relates to the coupling of light between two waveguides with dissimilar refractive indices and/or with dissimilar geometries. Examples of such coupling of light include coupling between an optical fibre and a thin semiconductor waveguide, and coupling between semiconductor waveguides of differing dimensions (for example where one of the waveguides comprises a photonic bandgap structure).

BACKGROUND OF THE INVENTION

The optical coupler between two different waveguides is an essential part of an optical system where the lightwave from one optical component is coupled into another component. For example, a low-loss coupler between an optical fibre and a waveguide is crucial for successful implementation of integrated optics in optical fibre communication systems. The difficulty increases when attempting to couple from a fibre to a waveguide with a large refractive index difference between the core and cladding of that waveguide. An example of such a waveguide is a silicon waveguide with silicon dioxide cladding, or indeed some other semiconductor waveguide. Direct coupling of these two waveguides (the fibre and the semiconductor) results in high coupling losses because of very different geometries and refractive indices (fibre diameter ~9 µm, refractive index ~1.45; waveguide thickness ~1 µm, refractive index >3).

As miniaturization in integrated optics, as in microelectronics, brings a number of advantages, there is a need for the coupling of light to/from very thin semiconductor waveguides with thicknesses, for example in the range 0.1 µm (or smaller) to 1 µm (or larger). It is difficult to efficiently couple light from optical fibres to such waveguides. The present invention seeks to enable robust and efficient coupling for this and other cases, using a novel form of grating-assisted directional coupling.

Grating-assisted directional couplers (GADCs) are fundamental guided-wave components in some distributed feedback lasers, distributed Bragg reflector lasers, optical wavelength filters and wavelength division multiplexing devices. A typical known GADC is shown in the accompanying FIG. 1, and consists of two waveguides, a (with height $h_a$ and refractive index $n_a$) and b (with height $h_b$, and refractive index $n_1$) a grating region (with height H), and a separation layer (with height $h_1$ and refractive index $n_1$). The purpose of this coupler is to enable power transfer from one waveguide to the other, over a minimum grating length (L) and with maximum efficiency. The grating enables matching between propagation constants of two interacting waveguide modes that exchange optical power. However, if the overlap of the two optical fields in the structure without the grating present is very poor, introduction of the grating will not improve the coupling efficiency significantly.

To couple optical power from an optical fibre (with refractive index $n_0$ to a thin semiconductor layer (with refractive index $n_1$, without the aid of any additional optical element, the power must be coupled first to the thick upper waveguide with refractive index very close to the refractive index of the fibre (waveguide b in FIG. 1) in order to achieve very small insertion loss. From this waveguide power is coupled to the thin semiconductor waveguide (waveguide a in FIG. 1). The large difference between these two waveguides in both thickness and refractive index makes the task very difficult to solve.

A single theoretical paper that has dealt with such a problem using a grating-assisted directional coupler, studying the coupling of light between a glass waveguide and a semiconductor waveguide (the latter with refractive index of ~3.2), is J. K. Butler et al, "Grating-assisted coupling of light between semiconductor and glass waveguides", J. Lightwave Technol., vol. 16, pp. 1038–1048, 1998. In this theoretical work, the maximum coupling efficiency, for TE polarisation, could be only 40% for optimized waveguide and grating parameters. For a change in the grating period of just 0.3 nm coupling efficiency drops by almost 50%, making the fabrication of this grating-assisted directional coupler extremely difficult to realize, and impractical for commercial applications.

BRIEF SUMMARY OF THE INVENTION

A first aspect of the present invention provides an optical coupler comprising an input waveguide, an intermediate waveguide, an output waveguide, a first grating situated between the input and intermediate waveguides, and a second grating situated between the intermediate and output waveguides such that, in use, light propagating in the input waveguide is coupled into the intermediate waveguide with the assistance of the first grating, and thence is coupled into the output waveguide with the assistance of the second grating.

It is to be understood that the direction of propagation of light through the optical coupler preferably is reversible, so that light propagating in the output waveguide may be coupled into the intermediate waveguide with the assistance of the second grating, and thence coupled into the input waveguide with the assistance of the first grating. However, for simplicity and convenience, the invention is described herein in terms of the coupling of light from the input waveguide to the output waveguide.

The coupler according to the invention therefore includes at least two gratings, and preferably includes only two gratings (the first and second gratings).

The coupler according to the invention preferably is a directional coupler.

Preferred embodiments of the invention may therefore be regarded as a "Dual Grating-Assisted Directional Coupler" (DGADC).

The invention has the advantage that the use of two gratings and the intermediate waveguide enables high coupling efficiency between the input and the output waveguides, which preferably have differing geometries and/or refractive indices.

The coupler according to the invention preferably is fabricated as a layered structure, for example of semiconductor and/or dielectric materials. Most preferably, the waveguides and gratings of the coupler comprise such layers. The layers preferably are fabricated by means of deposition or epitaxial growth and selective etching, a process which is well known in the art.

As indicated earlier, the coupler according to the invention may be used, for example, to couple light between two waveguides having differing geometries and/or refractive indices. Preferably, a first waveguide, for example an optical fibre, may be arranged such that light propagating therein is coupled into the input waveguide of the coupler (or vice versa). Consequently, the input waveguide of the coupler preferably is dimensioned such that at least one transverse (i.e. cross-sectional) dimension thereof (preferably the thickness of the input waveguide layer for embodiments in which the waveguides comprise layers) is of the same order of magnitude as that of such a first waveguide (e.g. an optical fibre). Additionally or alternatively, in order to avoid the use of additional methods of reducing insertion loss (for example anti-reflection coatings and the like) the refractive index of the input waveguide preferably is such that it is relatively close to that of the first waveguide (e.g. a silica optical fibre having a refractive index of approximately 1.45).

The output waveguide of the coupler may be coupled to a second waveguide, such that light is coupled between the first waveguide (e.g. an optical fibre) and the second waveguide, via the coupler according to the invention. It is generally preferred, however, for the output waveguide of the coupler itself to be the "second waveguide". That is, the coupler preferably is used to couple light between an external first waveguide (e.g. an optical fibre) and the output waveguide of the coupler. The output waveguide of the coupler according to the invention preferably is a semiconductor waveguide of an integrated optical device.

It was also indicated earlier that the coupler according to the invention may be used, for example, to couple between two semiconductor waveguides of differing dimensions. In such cases, the "first" and "second" waveguides (between which the coupler is situated) may be the two semiconductor waveguides of differing dimensions. Alternatively, the first waveguide may be the input waveguide of the coupler, and/or the second waveguide may be the output waveguide of the coupler. The first or the second waveguide may, for example, comprise a photonic bandgap structure.

Consequently, as will be apparent, the input and output waveguides of the coupler according to the invention preferably have differing refractive indices and/or at least one differing transverse dimension. ("Transverse" herein being transverse to the direction of propagation of the light, and including "vertical" as well as "horizontal" dimensions, i.e. any dimension that is cross-sectional with respect to the propagation axis of the waveguide.)

The intermediate waveguide of the coupler preferably has a different refractive index and/or at least one different transverse dimension to that of the input waveguide and/or the output waveguide.

The coupler according to the invention advantageously has lower insertion loss, higher efficiency and better tolerances of structure parameters than any previously published design. Therefore, unlike previous coupler designs, it can enable the successful fabrication of a practicable integrated device that has satisfactory performance.

A second aspect of the invention provides an integrated optical device comprising an optical coupler according to the first aspect of the invention, in which the input waveguide and/or the output waveguide of the coupler comprises a semiconductor waveguide of the device.

The semiconductor waveguide of the device may, for example, comprise a semiconductor laser or a photodiode (or other component) of the device.

A third aspect of the invention provides the use of an optical coupler or device according to the invention, to couple light between an external first waveguide and the output waveguide of the coupler, via the input waveguide of the coupler.

The external first waveguide may, for example, comprise an optical fibre.

Other preferred and optional features of the invention are described below, and in the subsidiary claims.

SUMMARY OF THE DRAWINGS

Some preferred embodiments of the invention will now be described, by way of example, with reference to the accompanying drawings, of which.

DESCRIPTION OF PREFERRED EMBODIMENTS

Figure 1:
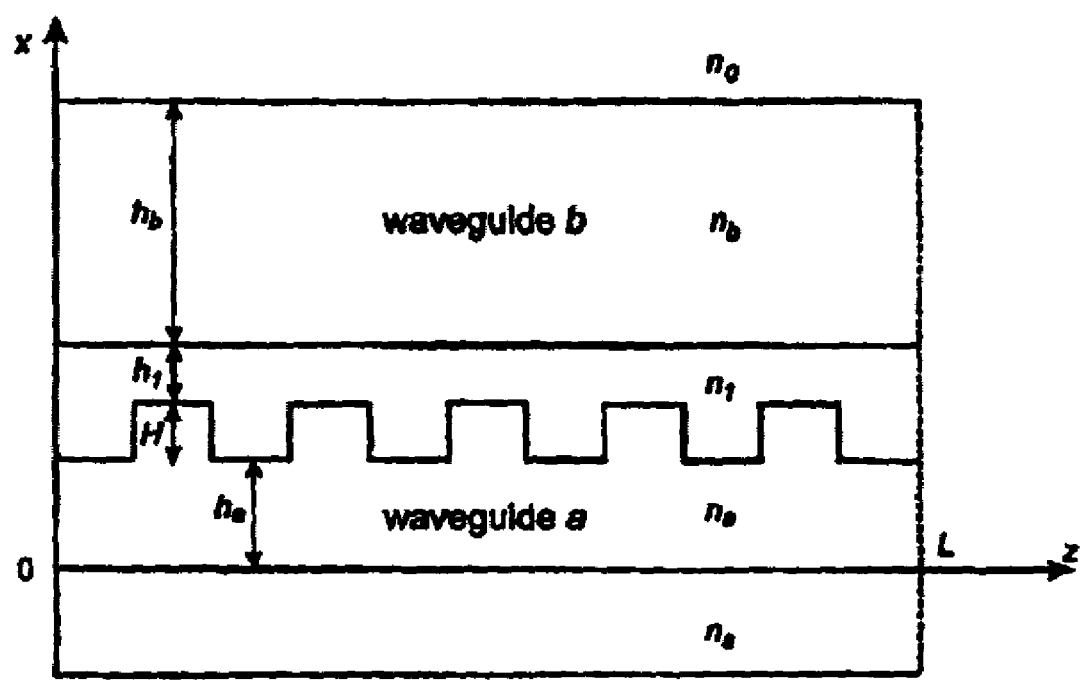
FIG. 1 (described above) is a schematic illustration of a conventional grating-assisted directional optical coupler.
Figure 2:
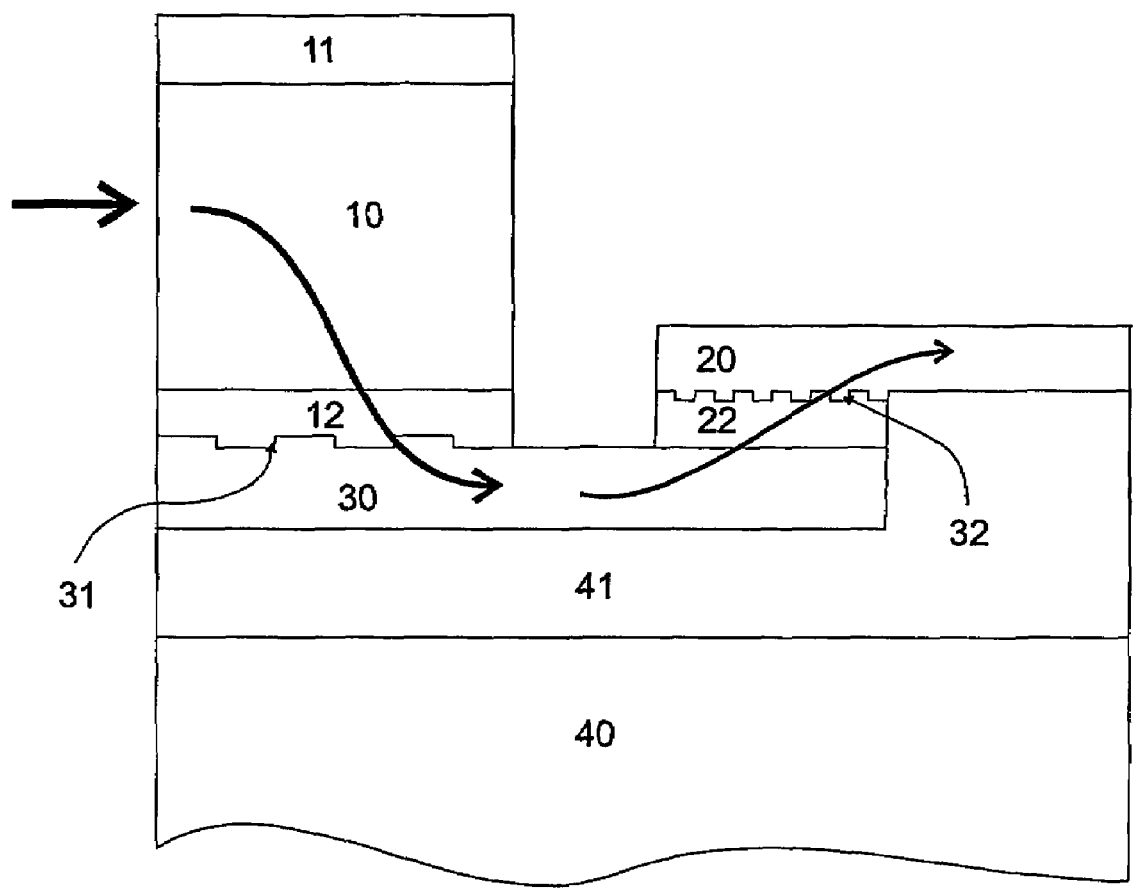
FIGS. 2 to 4 are schematic illustrations of three embodiments of the optical coupler according to the invention.

An example of a preferred embodiment of the invention is shown in FIG. 2. The coupler comprises the following: an approximately 5 µm thick input waveguide layer 10 having a refractive index very close to the refractive index of optical fibre (resulting in very low insertion loss); a silica top layer 11; a first transitional layer 12 having a refractive index slightly less than that of the input waveguide layer 10; a first grating 31; an intermediate waveguide layer 30; a second grating 32; a second transitional layer 22; and an output semiconductor waveguide layer 20.

Light from input waveguide layer 10 is coupled to the intermediate waveguide 30 using the first grating 31, and subsequently to the output semiconductor waveguide layer 20 using the second grating 32. Coupling lengths ($L_1$ and $L_2$, respectively, in FIG.5 ) and/or periods ($A_1$ and $A_2$ respectively, FIG. 5) and/or depths and/or duty cycles generally are different for the two gratings. The profile of the grating is usually rectangular, but other grating profiles may be used. The refractive index of intermediate waveguide layer 30 generally must be larger than that of input waveguide layer 10, but less than the refractive index of the output waveguide layer 20. The intermediate waveguide layer 30 is crucial for the operation of the coupler device, because it enables highly efficient coupling occurring at both gratings, consequently forming an efficient DGADC. Layer 41 below the other layers serves for isolation from a substrate 40, strongly reducing radiation losses.

Figure 3:
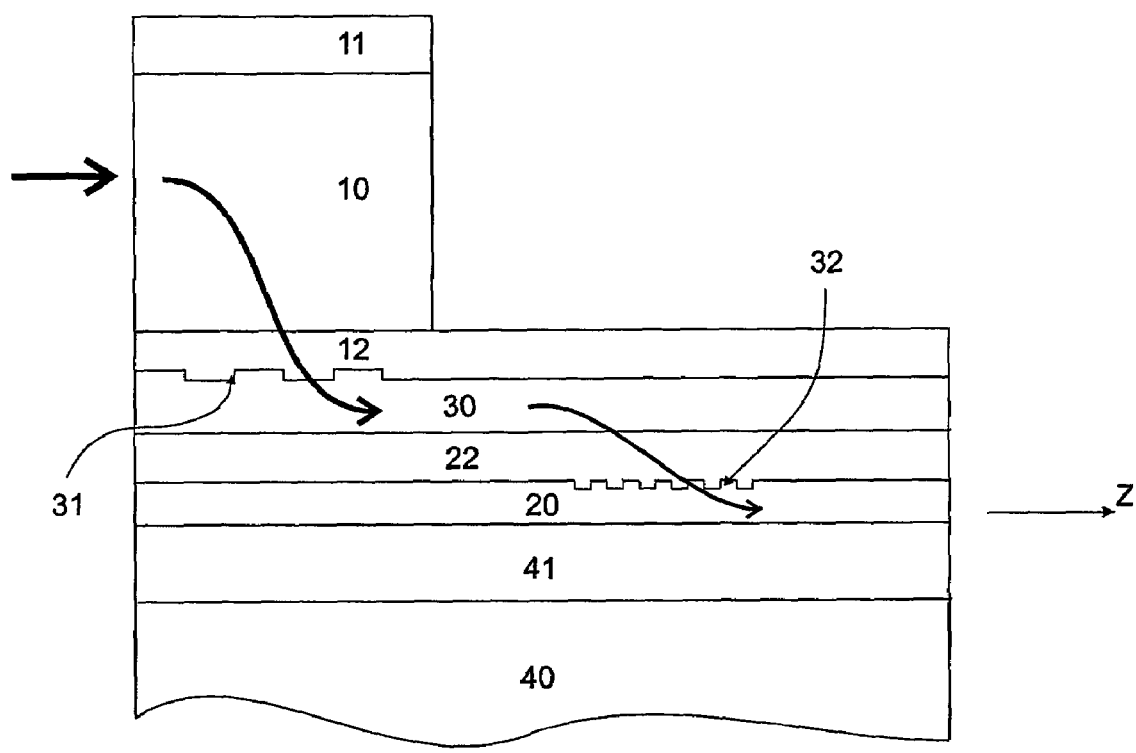
Figure 4:
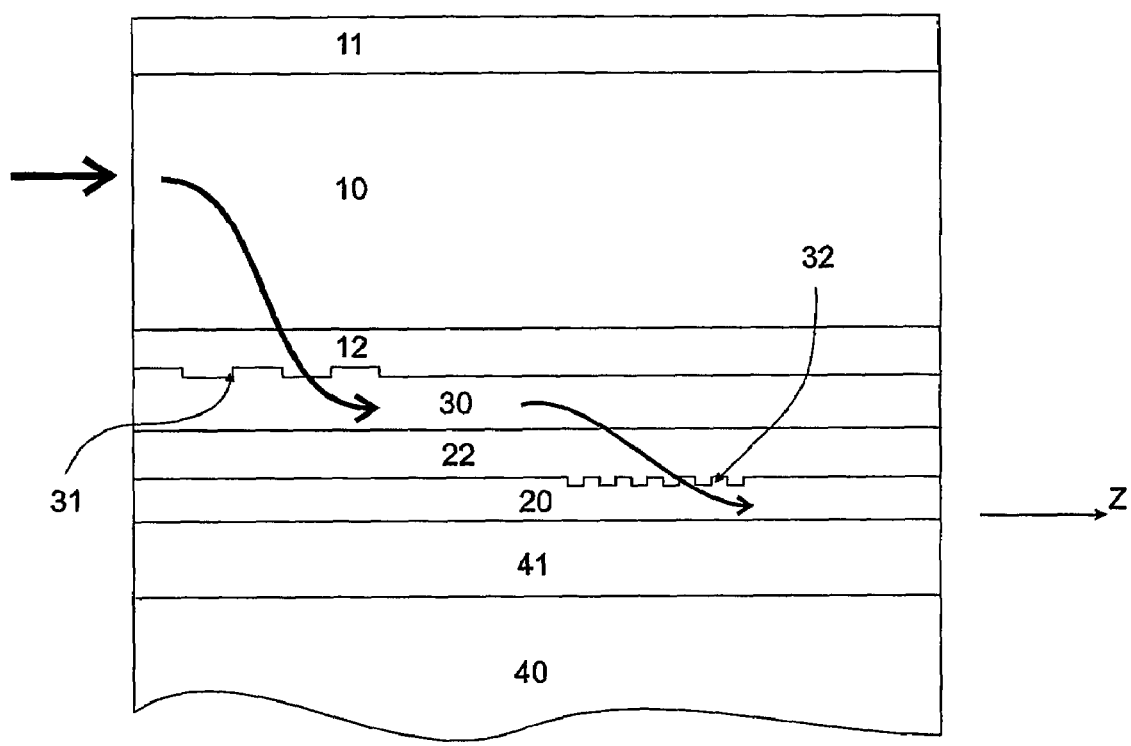

Two further embodiments of the invention are illustrated in FIGS. 3 and 4. These embodiments are simpler in fabrication terms, but generally will function satisfactorily only if waveguide coupling is efficient in the grating regions but is less efficient elsewhere. For example, in both FIGS. 3 and 4, the second grating 32 is used to couple light from the intermediate waveguide 30 to the output waveguide 20, via the second transitional layer 22. To the right (as drawn) of the second grating 32 however, optical modes in output waveguide 20 and intermediate waveguide layer 30 should not be phase matched in the direction of propagation (the z-direction as indicated), or light will generally couple from output waveguide 20, back into the intermediate waveguide 30.

In addition, for the embodiment illustrated in FIG. 4, there should normally be substantially no phase match in the z-direction of the modes in input waveguide 10 and intermediate waveguide 30, in the regions where the first grating 31 is not present (i.e. to the right, as drawn, of the first grating 31). These constraints generally make the embodiment in FIG. 2 preferable, even though fabrication may be slightly more complex.

Figure 5:
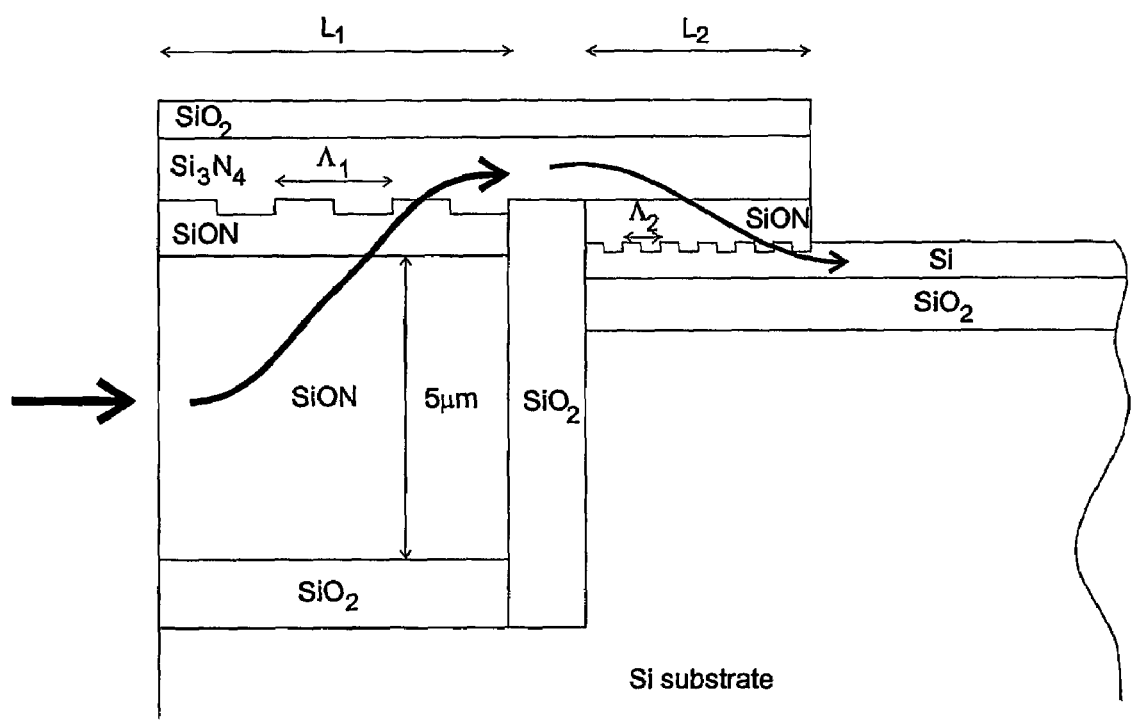
FIGS. 5 and 6 are schematic illustrations of two embodiments of the optical coupler according to the invention for coupling light between an optical fibre and a silicon-on-insulator (SOI) semiconductor waveguide.
Figure 6:
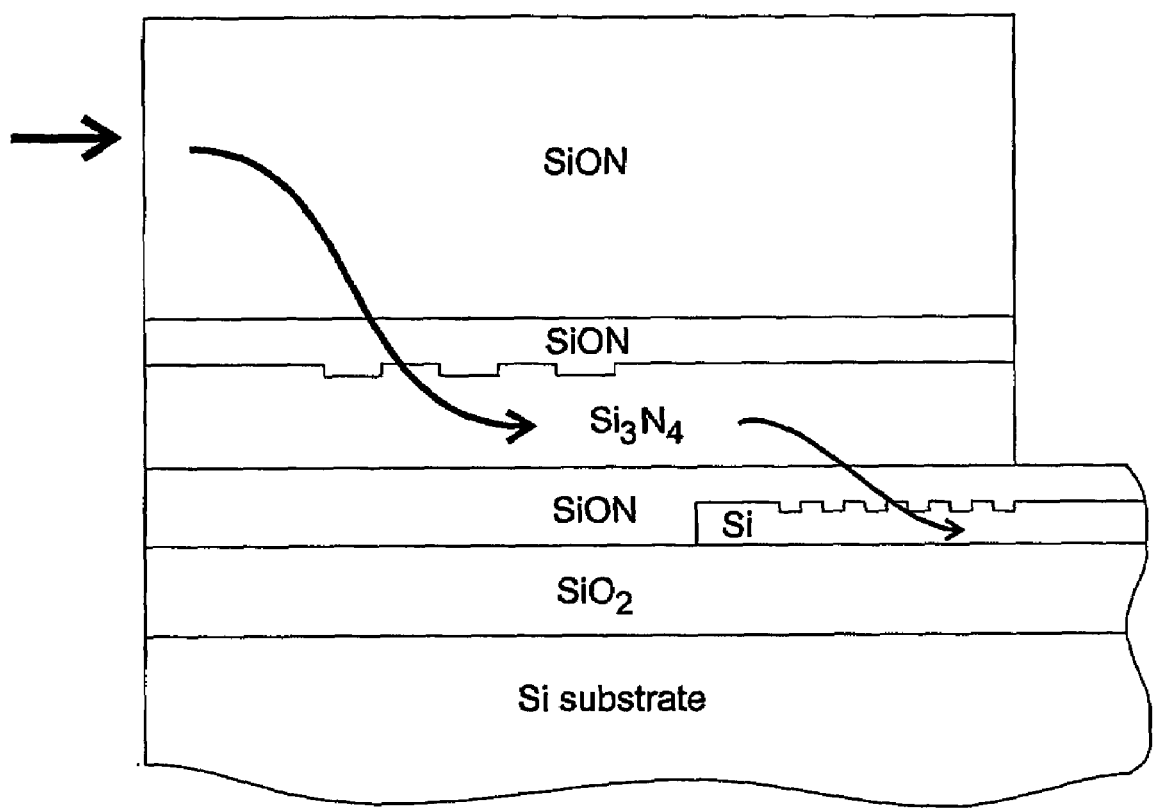

Two embodiments of the optical coupler according to the invention, based on Silicon on Insulator (SOI) technology, are illustrated schematically in FIGS. 5 and 6. Of course, the application of the invention is not limited to that example technology. In particular, III/V alloy semiconductor-based technologies (for example GaAs and its ternary compounds, or InP and its quaternary compounds) or lithium niobate or related compounds can also be used.

To demonstrate the performance of the present invention, it is instructive to make a comparison with the J. K. Butler et al paper referred to earlier. The embodiments of the invention illustrated in FIGS. 5 and 6 (which normally will be able to couple light to even more dense and thinner semiconductor layers than the coupler disclosed in the Butler et al paper) have a total theoretical efficiency, for TE polarisation, approaching 100%. Taking into account potential fabrication difficulties, the coupling efficiency of the FIGS. 5 and 6 embodiments can generally exceed 90% (coupling loss can, for example, be as low as 0.4 dB). The tolerance for the grating period has been calculated (by the inventors of the present invention) to be significantly higher than in the Butler et al coupler. Fabrication tolerances of the layer thicknesses and refractive indices, as well as the depths of the gratings, generally are not critical, and therefore the present invention enables the fabrication of practicable devices, rather than being merely a theoretical study.

The specific embodiments of the invention disclosed herein may be varied in many ways while retaining one or more of the features of the coupler. For example, the approach can be applicable to any homogeneous and isotropic material-based technology (SOI, GaAs, InP etc). Layers 10, 11 and 12 may, for example, be formed from glass, for example phosphosilicate glass, especially such glass having several percent by weight of p-type dopant. The waveguides may be of the rib, planar, strip or embedded type, for example.

The optical coupler according to the invention will normally have a good spectral selectivity, because of the presence of two cascaded gratings. This selectivity can be varied, for example by using chirped or apodized gratings with appropriate windows. It is also possible to make the coupler polarisation independent using a double approach, namely designing two completely different gratings in both coupling sections, one for TE and one for TM polarisation, or by using a double-periodic structure which may be viewed as a combination of two gratings with different grating functions. Alternatively some polarisation insensitivity can be introduced by chirping one or both gratings to broaden the spectral response of one or both gratings, and hence broaden the response in terms of the modal propagation constants.

Additional versatility can be introduced by making the gratings tunable. For example, by injection of carriers in a top waveguide or changing the temperature of the grating region, the refractive index in the region of the optical mode changes, modulating the effective index of the mode interacting with the grating, thereby making the grating tunable.

Figure 7:
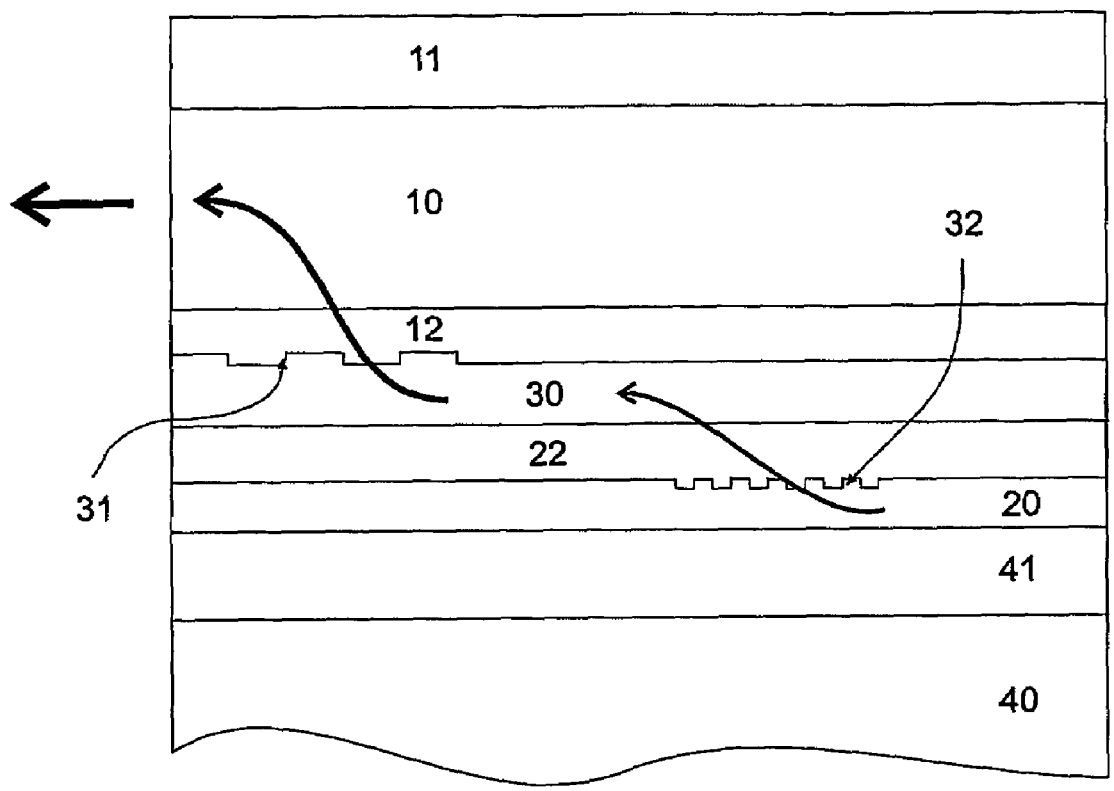
FIG. 7 is a schematic illustration of an embodiment of the optical coupler according to the invention for coupling light between a semiconductor laser and a large dimension waveguide or optical fibre.

The invention can, for example, be used for the realization of monolithic waveguide-detector systems, where a photo-diode can be implemented in the semiconductor (see FIGS. 3 and 4). FIG. 7 shows a further embodiment of the invention in which the coupler can be used for integration of a semiconductor laser (layer 20 in FIG. 7) and a glass (or other) waveguide (10). An optical sensor could also be fabricated using the principle of FIG. 7. For example, optical power from waveguide 20 can be coupled to waveguide 10. If waveguide 10 has a geometry and refractive index profile that results in a significant optical field (evanescent field) at the surface of the structure, or in layer 11, that field can be made to take part in sensing functions. Thus the sensing region is localized in the overall structure.

Although the invention has been described with reference to specific preferred embodiments thereof, many variations and modifications will be apparent to those skilled in the art. The appended claims are therefore intended to include all such variations and modifications.

The invention claimed is:

1. An optical coupler comprising an input waveguide, an intermediate waveguide, an output waveguide, a first grating situated between the input and intermediate waveguides, and a second grating situated between the intermediate and output waveguides such that, in use, light propagating in the input waveguide is coupled into the intermediate waveguide wit the assistance of the first grating, and then is coupled into the output waveguide with the assistance of the second grating, wherein the intermediate waveguide has a higher refractive index than the input waveguide and a lower refractive index than the output waveguide.

2. A coupler according to claim 1, further comprising only two said ratings.

3. A coupler according to claim 1, which is a directional coupler.

4. A coupler according to claim 1, wherein the input and output waveguides have differing refractive indices.

5. A coupler according to claim 1, wherein the input and output waveguides have at least one differing transverse dimension.

6. A coupler according to claim 1, wherein the intermediate waveguide has at least one different transverse dimension to that of the input waveguide, or the output waveguide, or both.

7. A coupler according to claim 1, further comprising a first transitional layer situated between the input waveguide and the intermediate waveguide.

8. A coupler according to claim 1, further comprising a transitional layer situated between the output waveguide and the intermediate waveguide.

9. A coupler according to claim 8, further comprising a second transitional layer disposed between the output waveguide and the intermediate waveguide.

10. A coupler according to claim 1, wherein the first and second gratings have differing periods, or lengths, or depths, or profiles, or duty cycles, or any combination thereof.

11. A coupler according to claim 1, comprising a layered structure, in which each waveguide, grating or transitional layer comprises a respective layer or part thereof, of the structure.

12. A coupler according to claim 11, the layered structure comprises one or more layers of semiconductor material or dielectric material, or both.

13. A coupler according to claim 12, wherein the layered structure comprises one or more layers of semiconductor material, wherein the semiconductor material comprises one or more of: silicon or related compounds; gallium arsenide or related compounds; indium phosphide or related compounds; or lithium niobate or related compounds.

14. A coupler according to claim 12, wherein the layered structure comprises one or more layers of dielectric material, wherein to dielectric material is glass.

15. A coupler according to claim 1, wherein the waveguides comprise rib waveguides, or planar waveguides, or strip waveguides, or embedded waveguides, or any combination thereof.

16. An integrated optical device comprising an optical coupler according to claim 1, wherein the input waveguide or the output waveguide of the coupler comprises a semiconductor waveguide of the device.

17. A device according to claim 16, wherein the semiconductor waveguide of the device comprises a semiconductor laser of the device.

18. A device according to claim 16, wherein the semiconductor waveguide of the device comprises a photodiode of the device.

19. The use of an optical coupler or device according to claim 1, to couple light between an external first waveguide and the output waveguide of the coupler, via the input waveguide of the coupler.

20. The use according to claim 19, wherein the external first waveguide comprises an optical fibre.

* * * * *